Patented Dec. 22, 1953

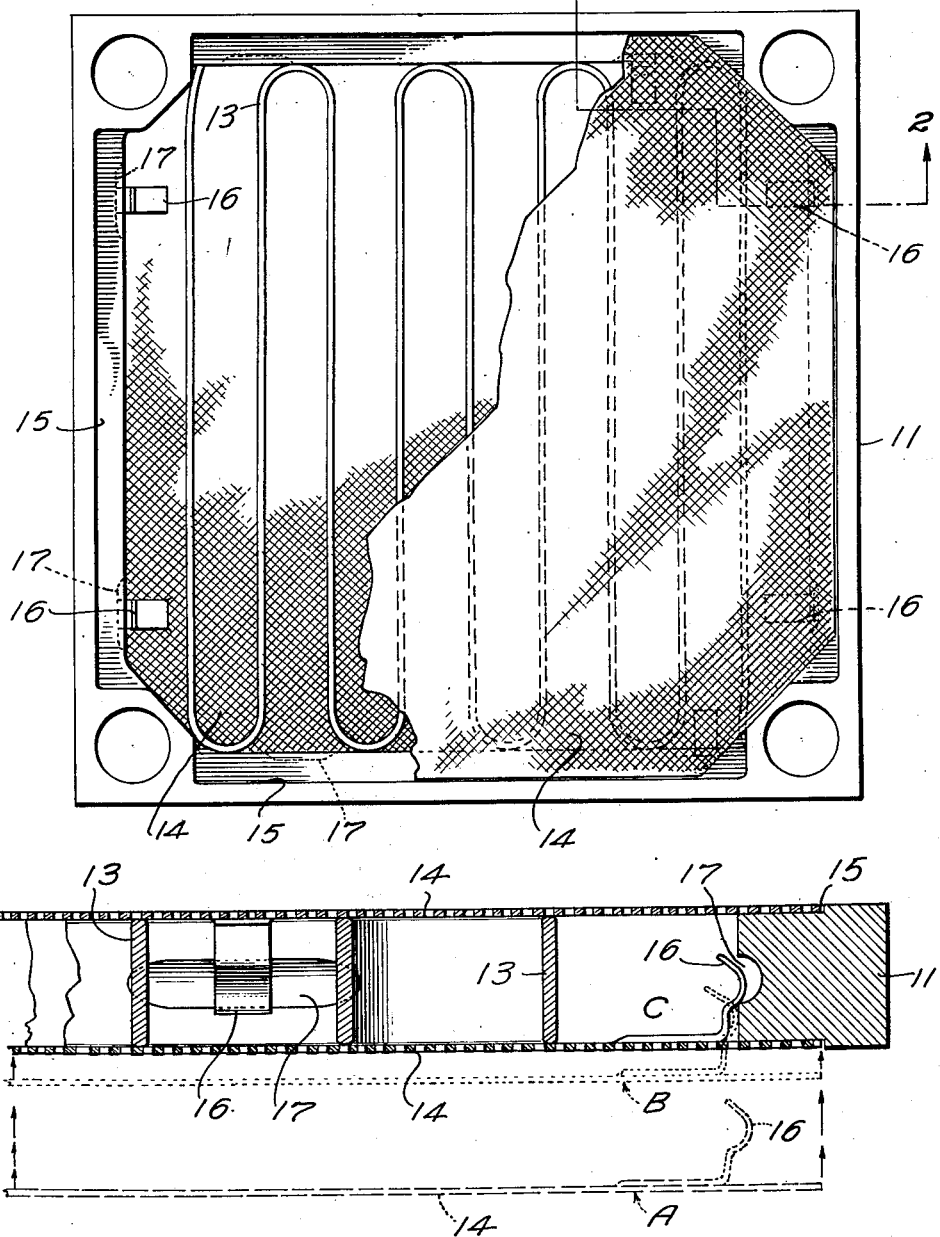

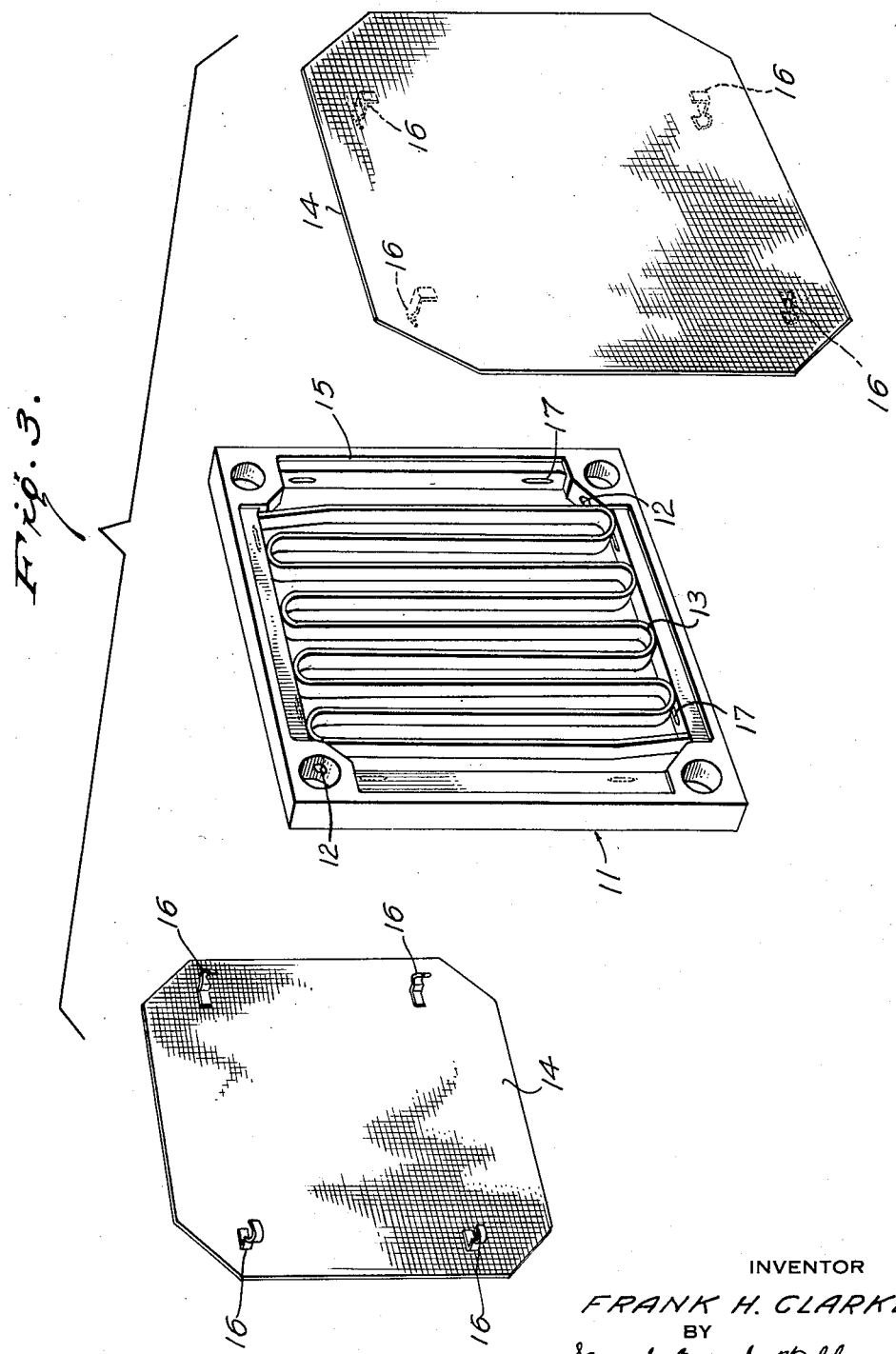

2,663,431

UNITED STATES PATENT OFFICE 2,663,431

FILTER PLATE SCREEN CLIP

Frank Howard Clarke, Pearl River, N. Y., assignor to American Cyanamid Company, New York, N. Y., a corporation of Maine Application August 26, 1950, Serial No. 181,628

2 Claims. (Cl. 210—195)

This invention relates to a screen retaining clip for holding in place screens on filter plate assemblies.

In the past it has been customary to assemble filter plates for use in the standard types of filter plate frames by assembling a screen to the frame using screws for fasteners.

For use in sterile filtrations, such as occur in the pharmaceutical industry and in the production of wines, beers, liquors and other edible products, absolute cleanliness is required and at times an aseptic technique is mandatory. Under such conditions, the filter plate assemblies must be disassembled to their component parts, then individual pieces, cleansed, and reassembled. This has been particularly difficult when it was necessary to maintain the pieces sterile during the assembly.

I have found that by using a special type of retainer clip as herein described and set forth, it is possible to cut down the time of assembly of plates for a multi-plate press from hours to minutes.

It is an object of this invention to provide a filter plate screen assembly which may be rapidly locked in place in a firm and rapid fashion by error-proof means so that relatively unskilled help may perform the operation.

My new type of filter plate screen may be used in connection with through-filter plates in which a spacer is used between the screens and the fluid flows in alternate plates, and out the others, or it may be used in connection with a built-up solid type of plate in which the liquid flows into channels in the plate and from the channels to exit conduits.

In use, after their assembly, the filter plate frames, including the screens such as herein described, may be assembled with sterile filter pads, such as asbestos, between the respective plates and the fluid passed from one through the filter pad to the adjacent plate whereby production quantities of fluids may be rendered sterile, and whereby all traces of contaminants may be removed.

My type of filter plate screen has proved particularly useful in filtering out various undesired portions from blood serum solutions to give sterile blood fractions.

Other advantages of my invention will appear from the accompanying description, drawings, and appended claims.

In the drawings,

Figure 1 is a view showing the front of a filter plate frame.

Figure 2 is a cross-section through a built-up filter plate frame, showing the clip positions.

Figure 3 is a pictorial sketch of a disassembled filter plate frame ready for assembly.

The filter plate frame 11 may be equipped with support ears, may have various channel constructions, and may be of a size and shape suitable for the particular operation under consideration.

In the modification shown in Figure 3, alternate corner ports are open to feed into the particular frame involved through ports 12. Inside of the frame is a spacer 13 for supporting the screens 14 against external pressure. The spacer may be of spring stock which will snap into position. On each side of the filter plate frame is a filter plate screen 14. A single filter plate screen may be used for an end frame or elsewhere if convenient.

These screens fit into recesses 15 in the face of the filter plate frame so that the screens are flush with the faces of the filter plate frames.

To retain these screens in position, in the place of screws which have been previously used, I fasten, as for example, by welding, to each of the filter plate screens, a plurality of retaining clips 16. The clips, alternatively, may be formed integral with the screen stock. The clips as shown clearly in Figure 2 fit into retaining clip grooves 17 which are formed, as for example, by milling, in the internal portion of the filter plate frame.

The retaining clips should be of such length and curvature that a camming curve of the clip fits against the retaining clip grooves in such fashion that when assembled, by the camming action of the retaining clip curve there is a positive inward force so that at all times and under all conditions, the clip has a tendency to draw the screen into the filter plate frame so that the screen is held smoothly and uniformly against the surfaces of the filter plate frame, in spite of dimensional changes due to wear, temperature, etc.

As shown in Figure 2, the camming curve should be a reverse curve so that the clips are sprung from their normal position as shown at A into an inward position as shown at B when the screen is pressed inwardly. Further movement to position C permits the camming curve portion of the clip to spring partially into the groove 17, thereby positioning the clip and screen assembly.

Whereas I have shown 4 clips for each screen, this number, of course, may be varied.

The retaining clip grooves in the filter plate frame on each side of the filter plate should be staggered so that the clips will not interfere with each other.

I have found that by the use of the retaining clips and the retaining clip grooves, it is possible to snap the screens into and out of position instantly and that the clips retain the screens more effectively in position than the previously used screw fasteners.

Whereas perforated sheet material is shown for the screens, the screens may, of course, be made up from woven stock or otherwise formed screen material.

The material of construction throughout may be any material which is resistant to the products for which the frame is designed. In general, a resistant material such as stainless steel will be found most advantageous.

While the invention has been illustrated in a preferred form, it is to be appreciated that the full scope of my invention is as set forth in the appended claims.

I claim:

1. A filter plate frame assembly comprising an open interior flat-faced frame, adapted to be placed in juxtaposition to other similar frames, grooves in the inner portions of said frame, each face of said frame having a recess therein extending from the inner edges of said frame partway across the face of said frame, filter plate screens having integral therewith curved retaining clips fitting into said grooves, said clips being so spaced that the clips extend into said grooves and exert a positive inward force on the screens, said screens fitting into the recesses in the faces of said frame, and spacing means inside of said frame between said screens and separating said screens.

2. A filter plate frame assembly comprising an open interior flat-faced filter plate frame, at least one filter plate frame screen, the face of said filter plate frame extending from the inner edges of said frame having a recess therein, grooves in the inner edges of said filter plate frame, retaining clips integral with said screen having camming surfaces coacting with said grooves whereby the filter plate screen is positively drawn into said recesses in said filter plate frame.

FRANK HOWARD CLARKE.

References Cited in the file of this patent

UNITED STATES PATENTS

| Number | Name | Date |
|---|---|---|
| 1,540,251 | Buckley et al. | June 2, 1925 |
| 1,726,035 | Loew | Aug. 27, 1929 |
| 2,065,908 | Pihl | Dec. 29, 1936 |
| 2,313,612 | Alsop | Mar. 9, 1943 |
| 2,444,149 | Aldridge | June 29, 1948 |

FOREIGN PATENTS

| Number | Country | Date |
|---|---|---|
| 2,722 | Great Britain | of 1895 |
| 108,869 | Great Britain | Aug. 30, 1917 |